United States Patent [19]

Stark

[11] Patent Number: 5,677,484
[45] Date of Patent: Oct. 14, 1997

[54] DEVICE FOR MEASURING THE FLOW IN A FLUID CHANNEL

[75] Inventor: Hartmut Stark, Stockelsdorf, Germany

[73] Assignee: Drägerwerk Aktiengesellschaft, Lübeck, Germany

[21] Appl. No.: 565,356

[22] Filed: Nov. 30, 1995

[30] Foreign Application Priority Data

Jan. 18, 1995 [DE] Germany .................. 195 01 347.6

[51] Int. Cl.$^6$ .................................................. G01F 1/68
[52] U.S. Cl. ........................... 73/204.24; 73/204.17; 73/170.12
[58] Field of Search .............. 73/204.17, 204.23, 73/204.24, 170.12, 861.95, 204.15; 374/147, 148

[56] References Cited

U.S. PATENT DOCUMENTS

| | | | |
|---|---|---|---|
| 3,580,074 | 5/1971 | Wescott | 73/304 C |
| 4,782,708 | 11/1988 | Harrington et al. | 73/204.24 |
| 4,807,151 | 2/1989 | Citron | 73/204.15 |
| 4,821,700 | 4/1989 | Weibler et al. | 73/204.24 |
| 5,119,674 | 6/1992 | Nielsen | 73/204.17 |
| 5,313,831 | 5/1994 | Beckamn | 73/204.24 |
| 5,493,906 | 2/1996 | Sen-Zhi | 73/204.15 |

FOREIGN PATENT DOCUMENTS

| | | | |
|---|---|---|---|
| 0 406 244 B1 | 1/1991 | European Pat. Off. | 73/204.24 |

*Primary Examiner*—Richard Chilcot
*Assistant Examiner*—Harshad Patel
*Attorney, Agent, or Firm*—McGlew and Tuttle

[57] ABSTRACT

A device for measuring the flow of a fluid in a fluid channel, with at least one thermocouple, whose thermojunctions are arranged one behind the other in the direction of flow of the fluid and are maintained at a working temperature higher than the fluid temperature by means of an ac power source 9. The thermocouple is connected to a measuring circuit evaluating the thermocouple voltage $U_T$. Continuous measurement with high accuracy is possible with a measuring circuit having a switching network, by which the ac power source is connected to the thermocouple at least during the measurement phase, and by which the ac voltage components superimposed to the thermocouple voltage are eliminated by subtraction.

8 Claims, 5 Drawing Sheets

DEVICE FOR MEASURING THE FLOW IN A FLUID CHANNEL

FIELD OF THE INVENTION

The present invention pertains to a device for measuring the flow of a fluid in a fluid channel, with at least one thermocouple, whose thermojunctions are arranged one behind the other in the direction of flow of the fluid and are maintained at a working temperature higher than the fluid temperature by means of an ac power source, and which thermocouple is connected to a measuring circuit evaluating the thermocouple voltage.

BACKGROUND OF THE INVENTION

A plurality of physical sensor principles, which differ in terms of their handling, sensitivity, manufacturing costs, and, last but not least, in terms of the freedom from reaction to the system to be measured, may be considered for measuring the flow of a fluid in a fluid channel. For example, differential pressure methods, Coriolis mass flow meters, turbulence counting, impeller, suspended solid particle, and thermal measurement methods, as well as acoustic and optical flow measurement principles may be mentioned in this connection. Such properties as sterilizability, size, and the introduction of energy into the measuring system also play an essential role, especially for use in medicine and medical applications.

Thermal measurement methods utilize the heat transport by the medium being measured as the measured effect, and devices in which the heat source and the temperature sensor are designed separately are used. The heat source is maintained for this purpose at a temperature which is higher than the fluid temperature, so that the change in temperature at the sensor arranged behind the heat source in the direction of flow is an indicator of the flow velocity of the fluid. Flow sensors in which the heat source and the temperature sensor are integrated into one element are also used. For evaluation, this element can be maintained at a constant excess temperature, e.g., by power control, and the energy supplied is an indicator of the flow velocity. The temperature can also be determined by resistance measurement if the heating capacity is maintained at a constant value. Such sensors, while having a simple design, do not permit the direction of flow to be recognized, and they require compensating circuits, because the actual measured value is determined as a small difference of high signal level.

Thermal flow-measuring methods, which use thermocouples to detect heat transport, are used as well. Such a device has become known from EP 0 406 244 B1. The thermojunctions of a thermocouple are arranged one behind the other in a fluid channel, and they are connected via a controlled switch to an ac power source for being heated to a working temperature which is higher than the fluid temperature. The thermocouple voltage developed on the thermocouple during the flow through the fluid channel is evaluated by means of a measuring circuit. To perform a measurement, the thermocouple heated by the ac power source is disconnected from the ac power source by means of the switch, and the thermocouple voltage, which is now free from ac voltage components, is then measured.

The disadvantage of the prior-art device is that the heating circuit of the thermocouple, which is prone to disturbances, must be opened to perform a measurement, as a result of which cooling of the thermocouple will take place during the measurement, as a consequence of which the accuracy of the flow measurement is reduced, on the one hand, and, on the other hand, only an intermittent measurement of the flow is possible, which is associated with a corresponding deterioration of the signal-to-noise ratio.

SUMMARY AND OBJECTS OF THE INVENTION

The primary object of the present invention is to improve a device of the above-described type such that a continuous measurement can be carried out with high accuracy.

This object is attained by the measuring circuit having a switching network, by which the ac power source is connected to the thermocouple at least during the measurement phase, and by which the ac voltage components superimposed to the thermocouple voltage are eliminated by subtraction.

The advantage of the present invention is essentially the fact that the ac voltage components are eliminated by subtraction by the switching network accommodating the thermocouple, and an improved signal-to-noise ratio is obtained for the thermocouple voltage due to the continuous measurement process.

The switching network is advantageously a resistance bridge, which is fed from the ac power source via a first bridge diagonal, and in which the thermocouple forms one of the four bridge resistors and the thermocouple voltage is tapped off as a diagonal voltage over the second diagonal of the resistance bridge. The ac voltage component is eliminated by means of the resistance bridge by subtraction from the thermocouple voltage.

It is advantageous to combine the switching network with a low-pass filter in order to eliminate ac voltage components that may have formed due to stray capacitance or leakage inductance.

The ac voltage component on the thermocouple voltage $U_T$ is advantageously compensated by means of a subtraction element arranged downstream of the thermocouple having at least one first signal input and a second signal input. To do so, the thermocouple connected to the ac power source is connected to the first signal input, which will then carry the thermocouple voltage $U_T$, to which the ac voltage is superimposed. An ac voltage signal, which is phase-shifted by 180° compared with the ac voltage present at the first signal input, and whose amplitude and frequency correspond to those of the ac voltage present at the first signal input, is sent to the second signal input. By superimposing the ac voltage components at the subtraction element, the thermocouple voltage $U_T$ freed from interference voltages is present at the signal output of the subtraction element. The correcting variable for setting the amplitude of the ac voltage signal at the second signal input is formed by phase-sensitive rectification from the ac voltage component superimposed to the thermocouple voltage $U_T$.

The object is also attained by the ac power source being connected to the thermocouple at least during the measurement phase and by a low-pass filter, by which the ac voltage superimposed to the thermocouple voltage is eliminated, being arranged downstream of the thermocouple.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENT

Figure 1:
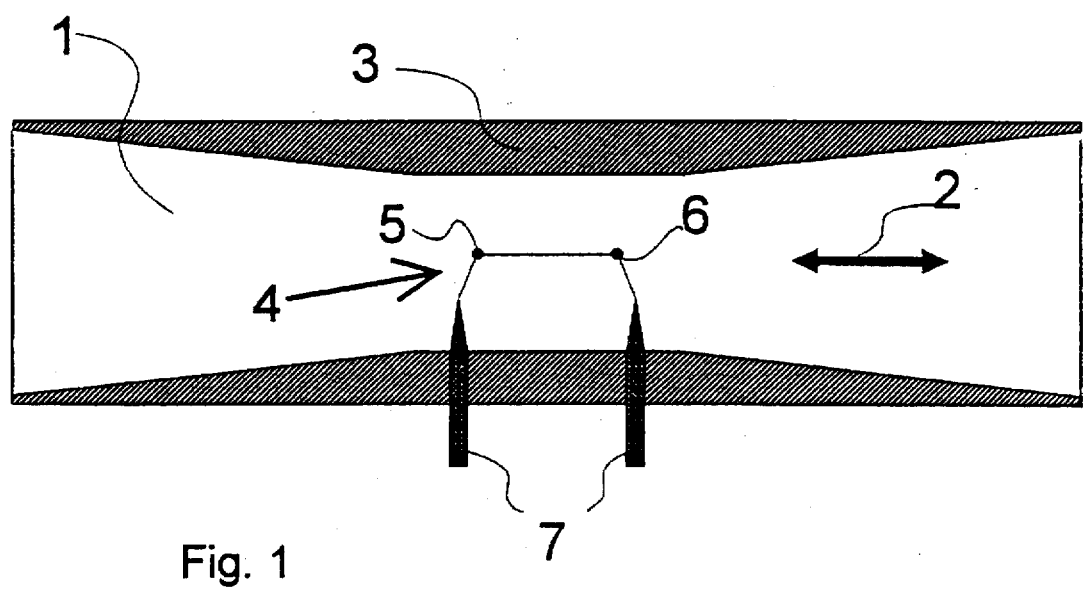
FIG. 1 is a schematic view of a thermocouple in a fluid channel.

FIG. 1 shows a longitudinal section of a fluid channel 1, through which a fluid flows in the direction of an arrow 2. A thermocouple 4, the first thermojunction 5 and the second thermojunction 6 of which are arranged one behind the other in the direction of the arrow 2, is arranged in a contracted section 3 of the fluid channel 1. The thermocouple 4 is contacted with leads 7. Depending on the direction of flow in the fluid channel 1, as is indicated by the directions of the arrow 2, the flow first reaches the first thermojunction 5 and then the second thermojunction 6, or first the second thermojunction 6 and then the first thermojunction 5.

Figure 2:
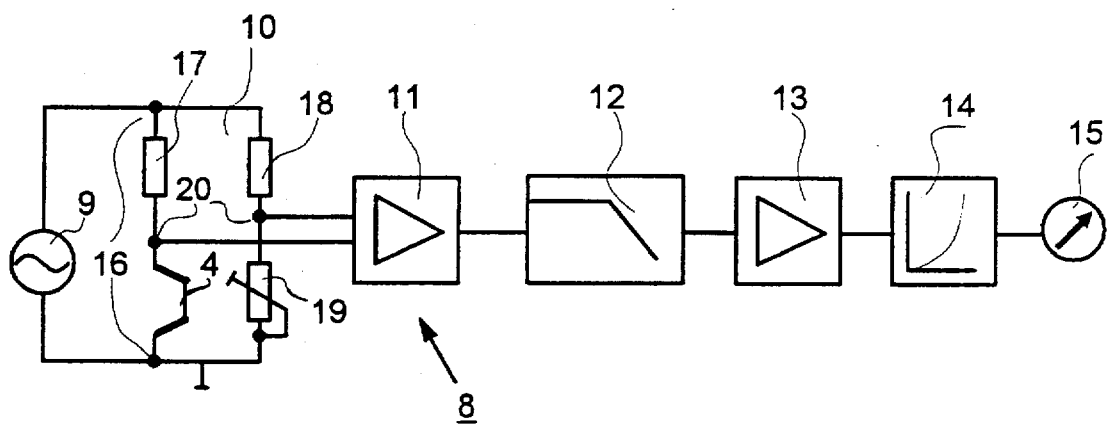
FIG. 2 is a diagrammatic view of a thermocouple in a first measuring circuit.

FIG. 2 shows a first measuring circuit 8 for the thermocouple 4, which is heated by an ac power source 9 to a working temperature which is higher than the fluid temperature. The first measuring circuit 8 comprises an ac elimination means as a series-connected arrangement of a resistance bridge 10. The first measuring circuit also includes a differential amplifier 11, a low-pass filter 12, a measuring amplifier 13, a linearizing circuit 14, and a display unit 15. A first fixed resistor 17 with the thermocouple 4, FIG. 1, and, in parallel thereto, a second fixed resistor 18 with a complex variable resistor 19, are arranged in series connection to form a first bridge diagonal 16 and a second bridge diagonal 20 of the resistance bridge 10. The first bridge diagonal 16 is connected to the ac power source 9. The second bridge diagonal 20 is connected to the input of the differential amplifier 11. The limit frequency of the low-pass filter 12 arranged downstream of the differential amplifier 11 is selected to be such that the ac voltage components which may still be present on the second bridge diagonal 20 are suppressed. Nonlinearities of the first measuring circuit 8 are compensated with the linearizing circuit 14.

The mode of operation of the first measuring circuit 8 will be explained below. The thermocouple 4 located in the fluid channel 1 is heated to the working temperature by means of the ac power source 9. Both thermojunctions 5, 6 of the thermocouple 4 now assume the same temperature if the fluid is prevented from flowing. The complex variable resistor 19 of the resistance bridge 10 is compensated such that an ac voltage component no longer appears on the second bridge diagonal 20. If the fluid channel 1 is now exposed to the flowing fluid, the thermojunctions 5, 6 are cooled at different intensities, depending on the direction of the arriving flow, and the thermocouple voltage $U_T$ generated on the thermocouple 4, which is amplified in the differential amplifier 11, drops on the second bridge diagonal 20. The ac voltage components on the thermocouple voltage $U_T$ are eliminated by subtraction due to the previous compensation of the resistance bridge 10. The ac voltage components which may still be present and are generated by leakage inductances or line capacities are suppressed by the low-pass filter 12.

Figure 3:
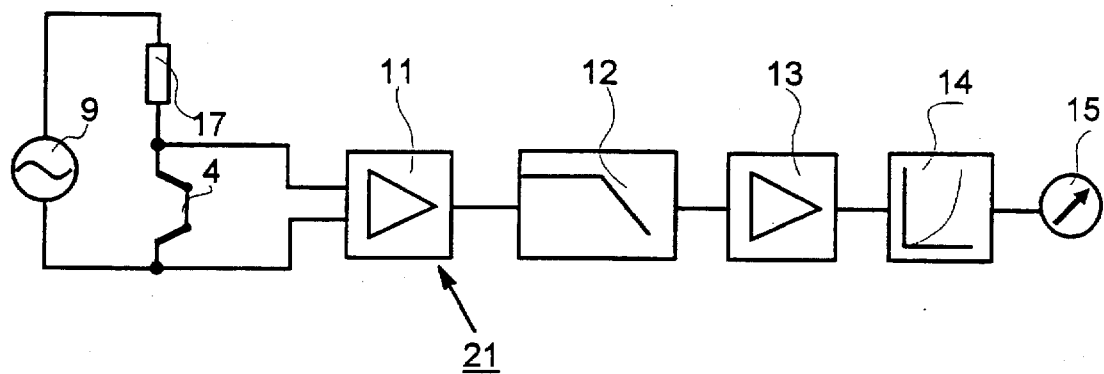
FIG. 3 is a diagrammatic view of a thermocouple in a second measuring circuit.

FIG. 3 shows the thermocouple 4 in a second measuring circuit 21. Identical components are designated with the same reference numbers as in FIG. 2. The difference from the first measuring circuit 8 is that the thermocouple 4 is directly connected to the ac power source 9 via the fixed resistor 17, and the entire ac voltage component on the thermocouple 4 is filtered out via the low-pass filter 12.

Figure 4:
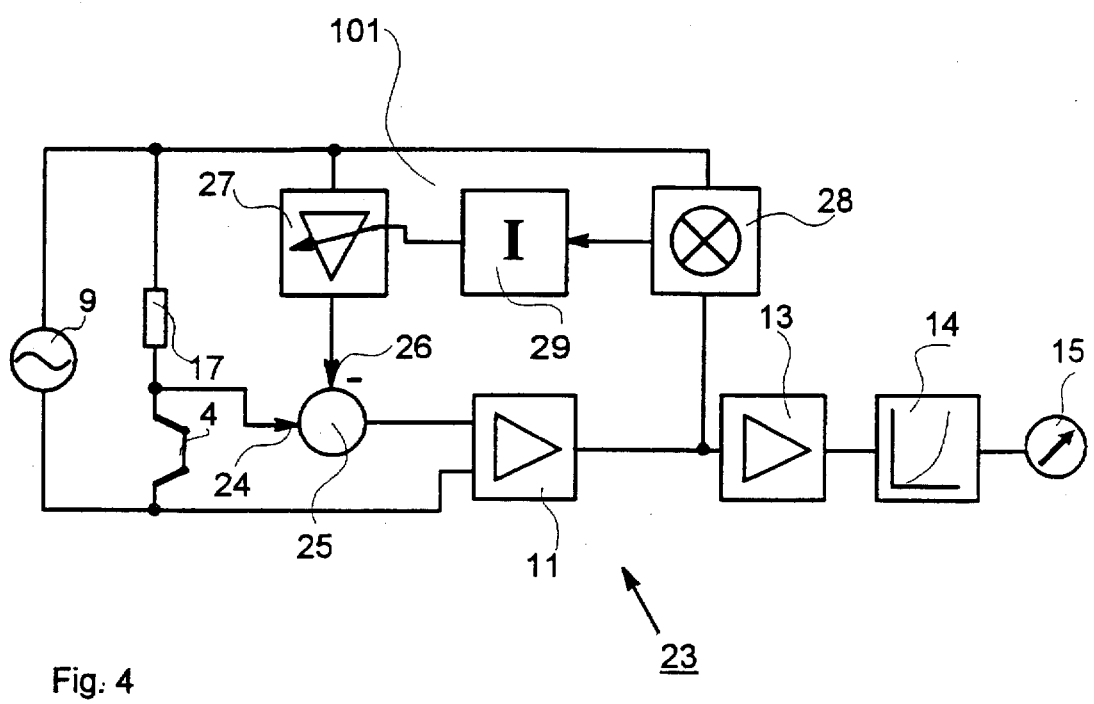
FIG. 4 is a diagrammatic view of a thermocouple in a third measuring circuit.

FIG. 4 schematically shows a third measuring circuit 23 for the thermocouple 4, in which a correcting variable is determined from the ac voltage superimposed to the thermocouple voltage $U_T$ by phase-sensitive rectification. The thermocouple voltage $U_T$, to which the ac voltage is superimposed, is sent to a subtraction element 25 via a first signal input 24, and a second signal input 26 of the subtraction element 25 is connected to the ac power source 9 via an amplifier 27 with variable gain. The negative sign at the second signal input 26 is to express the fact that a phase shift of the ac voltage signal by an angle PI takes place within the amplifier 27. The output signal of the subtraction element 25 is sent via the differential amplifier 11 to a lock-in amplifier 28, which receives the ac voltage of the ac power source 9 as an additional signal. The output signal of the lock-in amplifier 28 is converted into the correcting variable influencing the gain of the amplifier 27 in an integrator 29 arranged downstream of the lock-in amplifier 28. The correcting variable depends essentially on the amplitude of the ac voltage components at the output of the subtraction element 25 and at the output of the differential amplifier 11. In the ease of complete compensation of the ac voltage components in the subtraction element 25, the output signal of the lock-in amplifier 28 assumes the value zero, and the correcting variable for the gain of the amplifier 27 remains unchanged. The fixed resistor 17 connected to the ac power source 9, the subtraction element 25, the differential amplifier 11, the lock-in amplifier 28, the integrator 29, and the amplifier 27 form together an ac elimination means 101.

The items 11, 13, 14, 15 in FIG. 4 correspond to those in, FIG. 2.

The compensation of the ac voltage component by the third measuring circuit 23 leads to a further improvement in the signal-to-noise ratio for the thermocouple voltage $U_T$.

Figure 5:
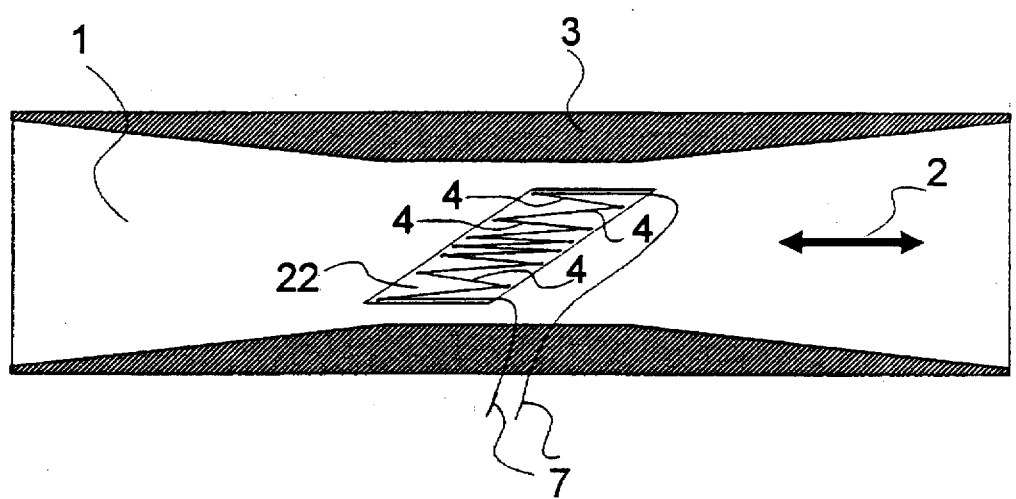
FIG. 5 is a schematic view of a thermocouples arranged in a zigzag pattern on a film carrier.

An alternative embodiment for arranging the thermocouples 4 in the fluid channel 1 comprises of arranging a plurality of thermocouples on a flat support 22 such that the zigzag structure shown in FIG. 5 is obtained. The flow profile changing with the flow can be taken into account by suitably distributing the thermocouples over the flow cross section.

While specific embodiments of the invention have been shown and described in, detail to illustrate the application of the principles of the invention, it will be understood that the invention may be embodied otherwise without departing from such principles.

What is claimed is:

1. A device for measuring fluid flow in a fluid channel, comprising:

a thermocouple including thermojunctions arranged one behind the other in a direction of flow defined by the fluid channel;

an ac power source connected to said thermocouple for maintaining a working temperature of said thermocouple higher than a temperature of said fluid;

a measuring circuit connected to said thermocouple for evaluating a thermocouple voltage, said measuring circuit including ac elimination means for eliminating during a measurement phase, by substraction, ac voltage components superimposed on said thermocouple voltage.

2. A device according to claim 1, wherein said ac elimination means includes a resistance bridge connected to said ac power source at a first bridge diagonal, said resistance bridge including bridge resistors connected to said thermocouple to form said resistance bridge, said resistance bridge having a second bridge diagonal with means for tapping said thermocouple voltage at said second bridge diagonal.

3. A device according to claim 1, further comprising a low pass filter arranged downstream of said ac elimination means.

4. A device according to claim 1, wherein said ac elimination means includes one subtraction element with at least one first signal input and a second signal input, said thermocouple being connected to said first signal input;

means for generating a phase-shifted ac voltage signal, phase shifted by 180° relative to said ac voltage of said ac power source, said phase shifted ac voltage signal having an amplitude and frequency corresponding to said ac voltage components superimposed to said thermocouple voltage, said phase shifted voltage being applied to said second signal input.

5. A device according to claim 4, wherein said phase shifted ac voltage signal means includes means for phase sensitive rectification of an ac voltage components superimposed on said thermocouple voltage.

6. A device according to claim 1, wherein:

said ac power source forms said ac voltage components by maintaining said working temperature.

7. A device according to claim 1, wherein:

said ac power source applies ac to said thermocouple for maintaining said working temperature.

8. A device for measuring fluid flow in a fluid channel, comprising:

thermocouple with first and second thermojunctions, said thermojunctions being arranged one behind the other in a direction of flow as defined by said fluid channel;

an ac power source connected to said thermocouple at least during a measurement phase to maintain a working temperature of slid thermojunctions higher than a temperature of said fluid;

a measuring circuit evaluating said thermocouple voltage; and a low pass filter arranged downstream of said thermocouple for eliminating an ac voltage superimposed on said thermocouple voltage.

* * * * *